(12) United States Patent
Blanchester

(10) Patent No.: US 7,210,602 B2
(45) Date of Patent: May 1, 2007

(54) CAP ARRANGEMENT FOR A BOTTLE

(76) Inventor: Tom Blanchester, Suite 248, 1348 Washington Ave., Miami Beach, FL (US) 33139

( * ) Notice: Subject to any disclaimer, the term of this patent is extended or adjusted under 35 U.S.C. 154(b) by 282 days.

(21) Appl. No.: 10/658,910

(22) Filed: Sep. 10, 2003

(65) Prior Publication Data
US 2004/0050874 A1 Mar. 18, 2004

(30) Foreign Application Priority Data
Sep. 18, 2002 (SE) .................... 02-1363
Sep. 18, 2002 (SE) .................... 0202767

(51) Int. Cl.
B67D 1/07 (2006.01)
(52) U.S. Cl. .................. 222/192; 222/464.5; 222/331; 220/705; 220/709; 215/389
(58) Field of Classification Search ............... 222/192, 222/464.5, 331, 185, 481, 482, 321.6, 321.7, 222/321.8, 321.9, 330, 383.1, 485, 556, 478, 222/479, 481.5; 220/705, 708, 709, 713; 239/33; 215/388, 389
See application file for complete search history.

(56) References Cited
U.S. PATENT DOCUMENTS

| | | | |
|---|---|---|---|
| 2,613,988 A * | 10/1952 | Jarbeau ....................... 239/33 |
| 2,724,536 A * | 11/1955 | Pugh, Sr. .................. 229/103.1 |
| 2,805,809 A * | 9/1957 | Pugh ........................ 229/103.1 |
| 3,173,566 A | 3/1965 | Talbert |
| 3,220,587 A | 11/1965 | Griffin et al. |
| 5,799,873 A | 9/1998 | Lau |
| 6,010,034 A | 1/2000 | Walthers |
| 6,375,019 B1 * | 4/2002 | Hirota et al. ................ 215/229 |
| 2003/0102318 A1 * | 6/2003 | Lee ............................ 220/705 |

* cited by examiner

Primary Examiner—Kevin Shaver
Assistant Examiner—Stephanie E. Tyler
(74) Attorney, Agent, or Firm—Yi Li

(57) ABSTRACT

A multifunctional bottle cap is disclosed, which includes a cap body having a lower portion with internal threads for connecting to a neck of a bottle, and an upper portion having an upwardly protruding nozzle with an outlet opening at an edge portion of the nozzle; a straw having an upper end extending out of the protruding nozzle adjacent to the outlet opening, the straw being vertically movable to extend upward from the cap body; and a spray assembly having a press pumping mechanism, an aspiration tube, a pump button extending upwardly, and a spray nozzle in perpendicular to a longitudinal axis of the cap body; the spray pump being positioned on an opposing side of the protruding nozzle. The multifunctional bottle cap provides a user the ability to drink, spray and pour liquid from an attached bottle.

11 Claims, 9 Drawing Sheets

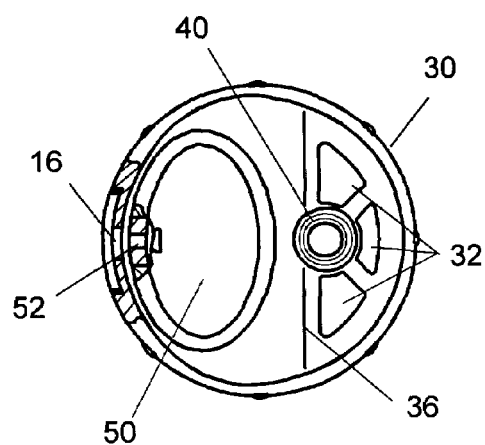
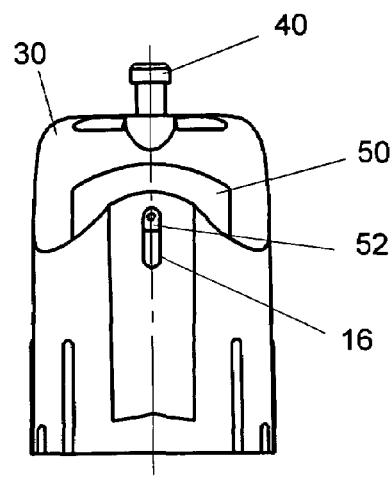
Fig. 3
Fig. 4
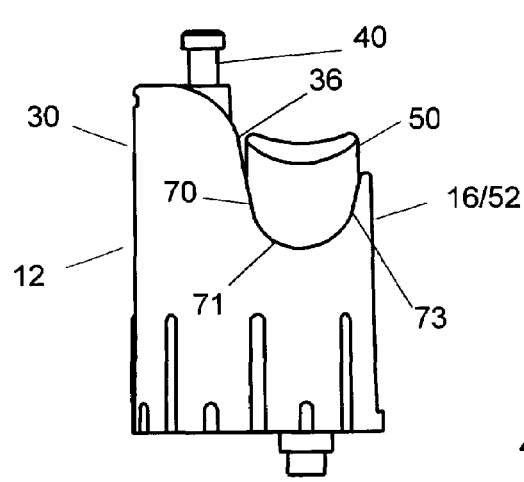
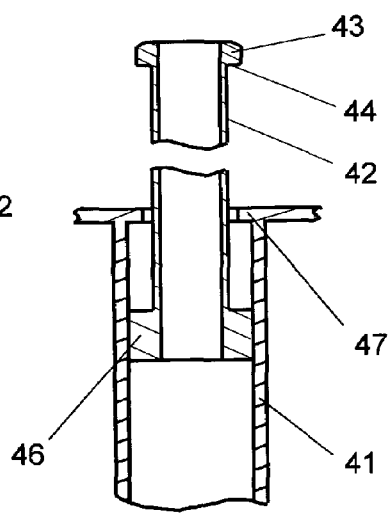
Fig. 5
Fig. 6

CAP ARRANGEMENT FOR A BOTTLE

CROSS REFERENCE TO RELATED APPLICATION

This application claims priority of Swedish patent application No. 0202767-0 filed Sep. 18, 2002, and U.S. design patent application Ser. No. 29/177,806 filed Mar. 16, 2003 which claims the priority of Swedish design application No. 02-1363 filed Sep. 18, 2002, which are herein incorporated by reference in its entirety.

FIELD OF THE INVENTION

The invention relates to a cap for a bottle, more particularly to a multifunctional bottle cap which enables a user to drink, spray and pour the liquid inside a bottle.

BACKGROUND OF THE INVENTION

It is known to provide bottles (for water, soda or other liquids) with a closing arrangement (or cap) that is formed with a protruding nozzle that enables the user to conveniently pour the liquid via the nozzle into the mouth while the lips enclose the nozzle. The nozzle has thus one of many openings at its edge portion that communicates with the inside of the closing arrangement and the bottle. The closing arrangement has means for blocking the openings of the nozzle.

It is also known to provide the closing arrangement with a straw that extends into the bottle, preferably to the bottom area.

If both such pouring nozzle and telescope straw are provided on the closing arrangement there is a risk that the straw makes the user more difficult to reach the nozzle and vice versa.

It is also desirable for the above-mentioned type of closing arrangement to integrate a manually operated spray pump including a spray nozzle to make it possible to direct the spray of the liquid in the bottle radially out from the body of the closing arrangement relative to the lengthwise direction of the bottle neck.

For practical reasons the spray pump has an activation button that is axially operable and is directed substantially parallel to the bottle neck. The button is exposed to the free upper end of the closing arrangement and may be affected by a finger (index finger) of the hand that is holding the bottle and/or the closing arrangement. However, a drawback is that the spray may inadvertently be directed towards the user's hand that holds the bottle/closing arrangement.

U.S. Pat. No. 5,799,873 (to Lan) discloses a dispensing system for simultaneously dispensing a liquid from a mouth controlled port and an ejection port. The mouth controlled port is a drinking straw extruding from the side of a body connected to a container. The ejection port is a triggering spray head connected to the top of the body. This system allows a user to either receive a spray of liquid for cooling or a stream of water for drinking through the straw. However, this system does not offer a pouring mechanism for the user to pour the liquid out from the container without taking out the closing arrangement.

U.S. Pat. No. 6,010,034 (to Walthers) discloses a dual-function sports bottle that has one liquid carrying container nested within another for carrying a drinking liquid in a relatively large outer chamber that can be accessed by using a straw that extends through an off-center opening, and for carrying a spraying liquid in a relatively small inner chamber that can accessed by using a manually operated spray assembly. Similar to Lan's dispensing system, this bottle does not offer a pouring mechanism for the user to pour the liquid out from the container without taking out the closing arrangement.

Therefore, it is desirable to have an improved multifunctional bottle cap which enables incorporation of a drinking straw, a spray mechanism, and a nozzle for pouring out liquid, but overcomes the problems associated with the integration of these different structural components into one single cap or closing arrangement.

SUMMARY OF THE INVENTION

In one embodiment, the present invention is related to a multifunctional bottle cap which comprises a cap body having a lower portion with internal threads for connecting to a neck of a bottle, and an upper portion having an upwardly protruding nozzle with an outlet opening at an edge portion of the nozzle; a straw having an upper end extending out of the protruding nozzle adjacent to the outlet opening. The straw is vertically movable to extend upward from the cap body. The straw can be telescopic, or single layer. The lower portion of the straw can also be flexible allowing bending when the straw is in a retrieved position. Using the multifunctional bottle cap, a user can drink liquid using the straw or the nozzle, and can also pour the liquid out through the nozzle.

In a further embodiment, the bottle cap further comprises a spray assembly which has a press pumping mechanism, an aspiration tube, a pump button extending upwardly, and a spray nozzle in perpendicular to a longitudinal axis of the cap body. The spray assembly is positioned next to the protruding nozzle.

In an alternative embodiment, the bottle cap only comprises a nozzle and a spray pump, which is suitable for spraying, evaporation or pouring the liquid.

One object of the present invention is to provide a bottle cap which integrates multiple structural components into one single cap and offers multiple functionalities.

A further object of the present invention is to provide a drinking straw movable between an extending and a retrieved position. Preferably, the straw is telescopic.

Another object of the present invention is to guide a user's finger for the spraying pump to avoid potential misdirection by a direction exclusive configuration. More particularly, the protruding nozzle of the cap body defines a nozzle wall. The nozzle wall provides a guiding surface for an extend index finger that moves downwardly towards the pump button that is disposed adjacent to the nozzle wall. The spray nozzle of the spray pump is directed in a direction perpendicular to the longitudinal axis of the bottle cap, away from the exposed surface of the nozzle wall. The lower portion of the nozzle wall extends downwardly into an upwardly open channel that has an opposite sidewall that is disposed at the circumference of the bottle cap. The pump button is disposed in the channel so that the finger must be oriented in the direction of the channel to effectively affect the pump button at least while the upper surface is disposed inside the channel.

BRIEF DESCRIPTION OF DRAWINGS

FIG. 3 shows a schematic view along line III—III in FIG. 1.

FIG. 4 shows a schematic front view of the top portion of the bottle cap of FIG. 1.

FIG. 5 shows a schematic side view of the top portion of the bottle cap of FIG. 1.

FIG. 6 shows a portion and schematic view of the telescope straw of one embodiment of the present invention.

DETAILED DESCRIPTION OF THE INVENTION

Figure 1:
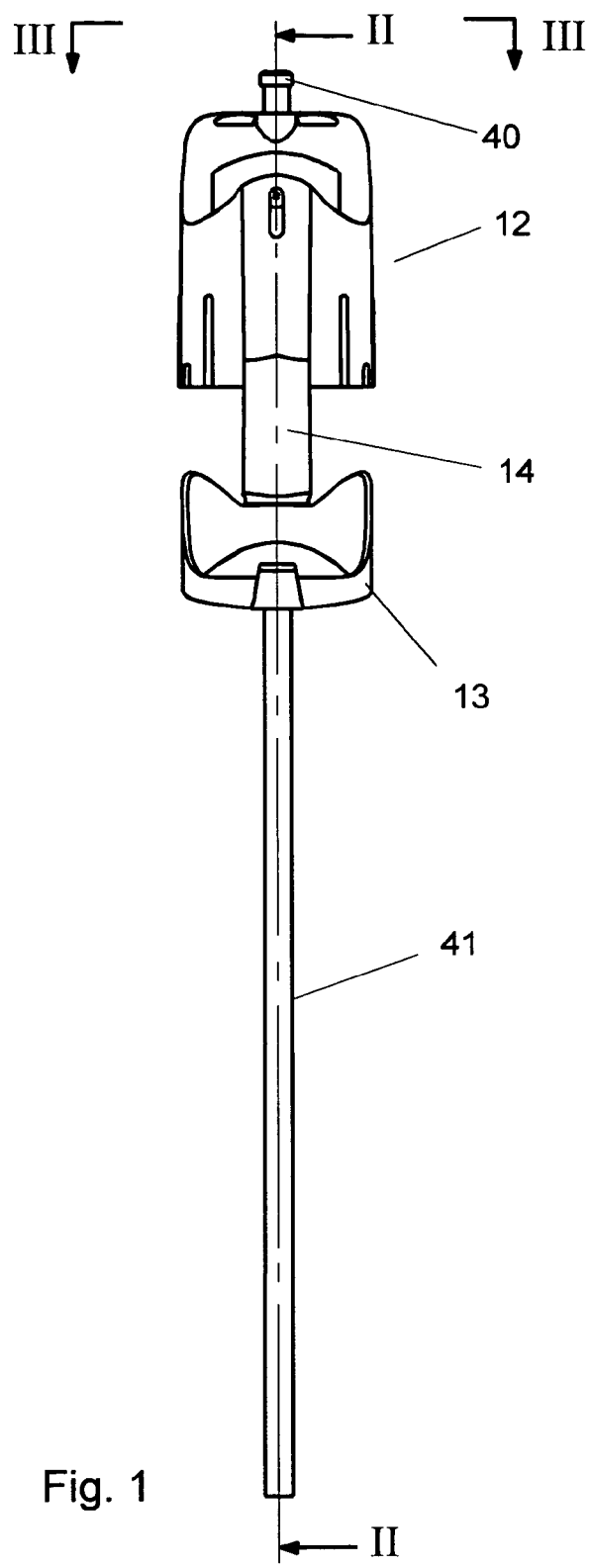
FIG. 1 shows a schematic view of a bottle cap of one embodiment of the present invention along line I—I in FIG. 2.
Figure 2:
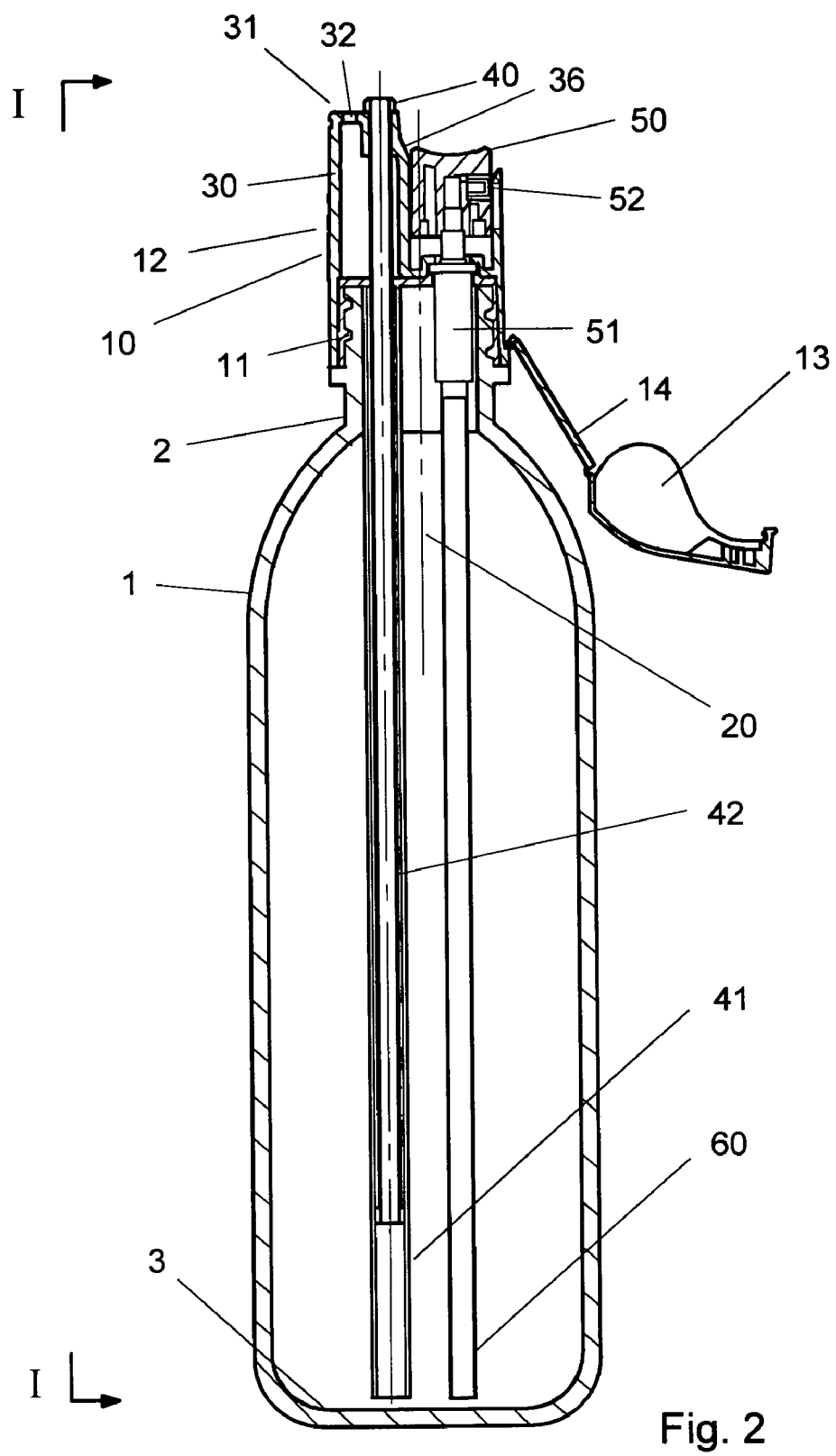
FIG. 2 shows a sectional view along line II—II in FIG. 1.

Now refer to FIGS. 1 and 2, FIG. 2 schematically illustrates a bottle 1 that has a neck 2 and a bottom 3. The bottle neck 2 is usually provided with an outer thread.

Figures 7A, 7B:
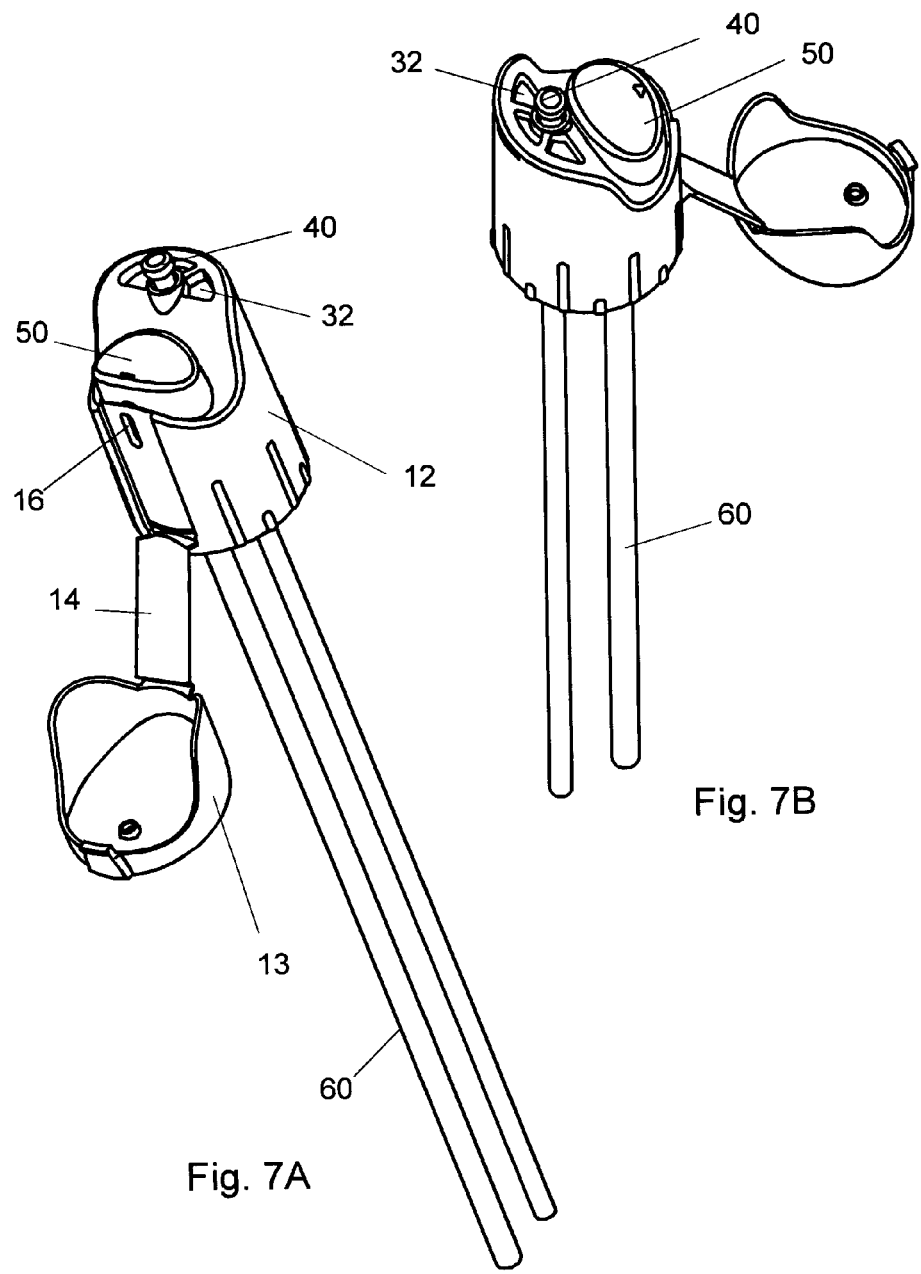
FIGS. 7A and 7B show a front and a rear perspective view, respectively, of the bottle cap of one embodiment of the present invention.

The neck 2 has a bottle cap 10, also referred to as a closing arrangement, mounted thereto with an inner thread 11. The thread 11 is arranged on an inside of a flap belonging to a body 12 of the bottle cap 10. The body 12 has an axle 20 that coincides with the axle of the bottle neck 2. The body 12 has an upwardly protruding nozzle 30. The nozzle 30 has an edge portion 31 with an opening 32, or a plurality of openings 32 as shown in FIG. 3 and FIG. 7A, going through the shell of the body 12. The liquid inside the bottle 1 can be poured out through the openings 32 by tilting the bottle. Further, the openings 32 are also the vent of the bottle for drinking.

Figures 8A, 8B:
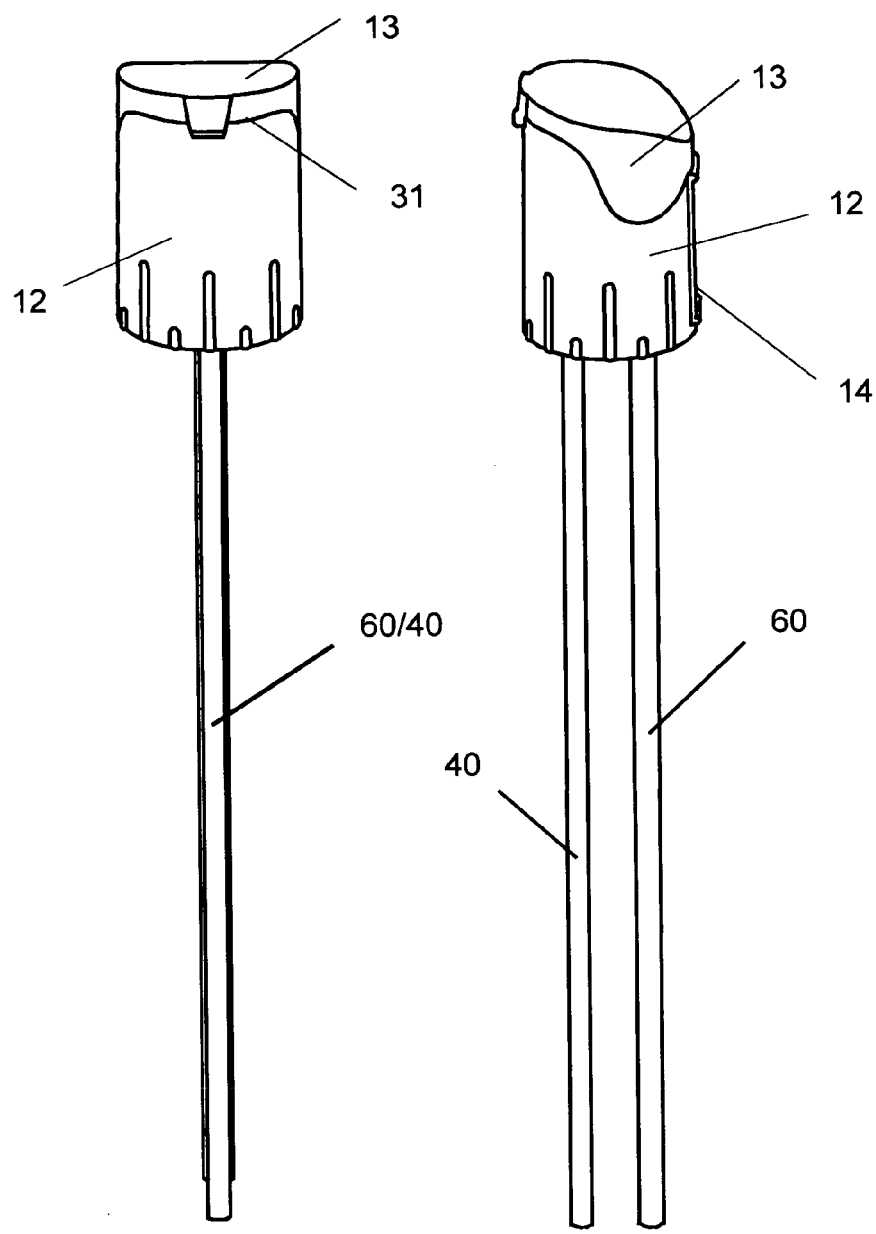
FIGS. 8A and 8B show a front and a side perspective view, respectively, of the top portion of the bottle cap of one embodiment of the present invention, wherein the swing lid is in a closed position.

In one embodiment, the body 12 has a lid 13 that has a shaft 14 swingably attached to a lower portion of the outside of the body 12. The lid 13 can be swung in over and be applied to the top of the body 12 to close the openings 32, as shown in FIGS. 8A and 8B.

In one embodiment, a telescope straw 40 extends out adjacent to, or through the openings 32 at the edge portion 31 of the nozzle 30. The telescope straw 40 has a first outer straw 41 that has an upper end attached to the edge portion 31 and another inner straw 42 that is extendable along the outer straw 41. As shown in FIG. 6, the upper end of the inner straw 42 has a thickened portion 43 and an exposed under surface 44. The lower end portion 46 of the inner straw 42 has a thickened portion that may encounter an upper end 47 of an inner portion of the outer straw 41 to prevent the withdrawal of the inner straw 42 from the outer straw 41. Preferably, the lower end of the outer straw 41 extends almost all the way down to the bottom 3 of the bottle 1.

The inner straw 42 can be pulled upward using teeth or a hand, to an extending position, for the convenience of drinking through the straw. When not in use, the inner straw 42 can be pushed back into the bottle with only the upper end 43 staying immediately above the edge portion 31, also referred as a retrieved position, so that the openings 32 can be closed by the lid 13. Such a movable feature is also feasible with a single layer straw. Since the distance for the upward movement is usually only about one inch or less, when the straw is in an extending position, the lower end of the straw is still substantially near the bottom of the bottle. For a non-telescopic straw, the straw can be either made of a single piece tube or can be made of two portions, an upper portion and a lower portion interconnected together.

Figures 9A, 9B:
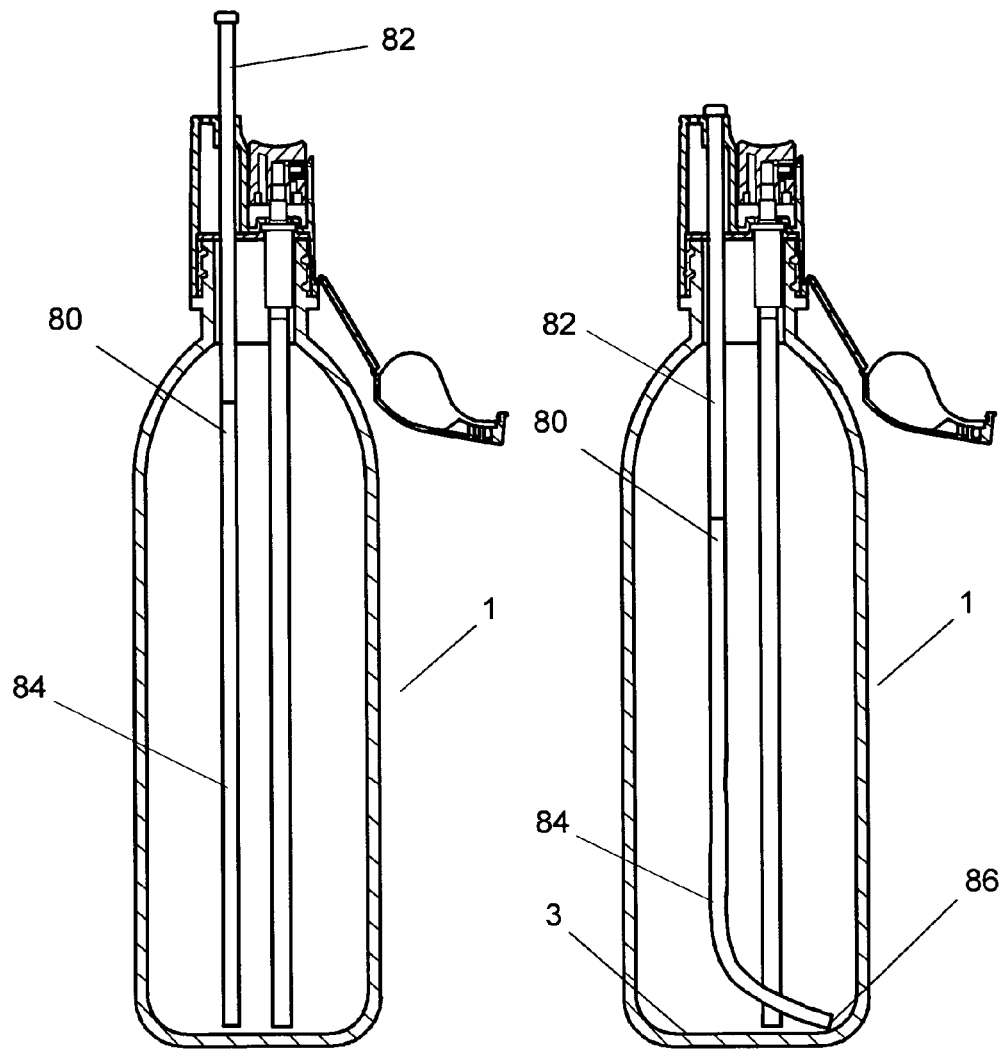
FIGS. 9A and 9B show a side view of a bottle cap of another embodiment of the present invention, wherein the single layer drinking straw has a flexible lower portion.

In a further embodiment, a single layer straw 80, as shown in FIGS. 9A and 9B, can have an upper portion 82 structurally similar to the upper portion of inner straw 42, and an interconnected lower portion 84 that is flexible. Preferably, the length of the straw 80 allows the lower end 86 reaching the bottom 3 of the bottle 1 when the upper portion 82 is in an upward extending position. When the upper portion 82 is pushed back into the retrieved position, the flexible lower end 86 is bent along the bottom 3 of the bottle.

In a preferred embodiment, a spraying assembly is integrated into the bottle cap, as shown in FIG. 2. A pump button 50 is axially movable in the axial direction of the body 12 to affect a press pumping mechanism 51 associated with the pump button 50. The pumping mechanism 51 is spring biased towards an upper end position. The pumping mechanism 51 has a spray nozzle 52 that is axially directed towards the axis 20 and has a vertical slit 16 in the shell of the body 12, as shown in FIGS. 4 and 7A. The press pumping mechanism 51 is similar to the press pump commonly used in the hair spray and perfume bottles.

As shown in FIG. 2, the pumping mechanism 51 is attached to an aspiration tube 60 which extends down into the inner space of the bottle 1 to, for example, the bottom 3.

The nozzle 30 has a nozzle wall 36. Because the spray nozzle 52 is directed in a normal direction away from the exposed nozzle wall 36 and the nozzle wall 36 forms a guiding surface for the index finger of a user's hand that grips about the bottle cap 10 and the neck 2 of the bottle 1, the risk for the hand blocking the spray nozzle 52 due to mispositioning is minimized.

Preferably, the upper surface of the button 50 is concave shaped, as shown in FIGS. 5 and 7A, to further enhance the guidance of the pumping index finger in a direction that is parallel with the nozzle wall 36. It is further noted that the concave shape is also complementary to the shape of the upper lip of a user. Therefore, it provides a comfort contact when a user drinks liquid through the opening 32.

As shown in FIGS. 4 and 5, the nozzle wall 36 can be downwardly associated with an upper edge of the sidewall 70 of a channel 71 that has another sidewall 73 which connects to the exterior of the body 12 adjacent to the slits 16. The upper surface of the button 50 can thus, when the button is not loaded, be situated near the upper edge of the channel 71 so that the pumping index finger is also guided between the opposite sidewalls 70 and 73 of the channel 71 during pumping.

In a further embodiment, the lid 13 has an opening at the position of the button 50, and a slot on the shaft 14 (not shown) so that when the lid 13 is closed, it only covers the openings 32, but not the button 50, and the spraying function of the bottle cap is still maintained.

The body of bottle cap 10 can be made of plastics, such as polypropylene, polyethylene, and other suitable materials. The straw, aspiration tube, and pump button can also be made of plastics.

Figure 11:
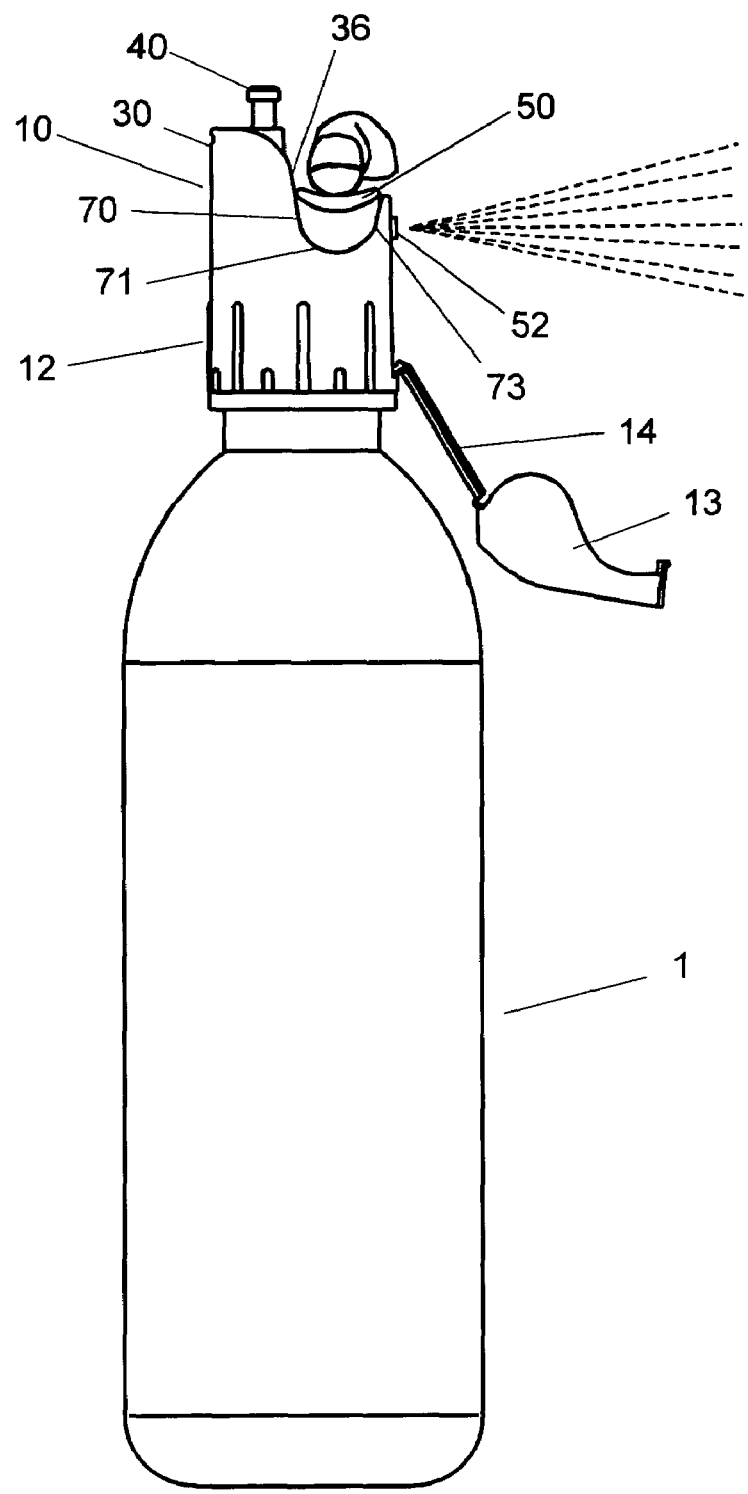
FIG. 11 shows a schematic view of the bottle cap of FIG. 7 connected with a bottle, wherein a user sprays the liquid by pressing on the spray button of the bottle cap.
Figure 12:
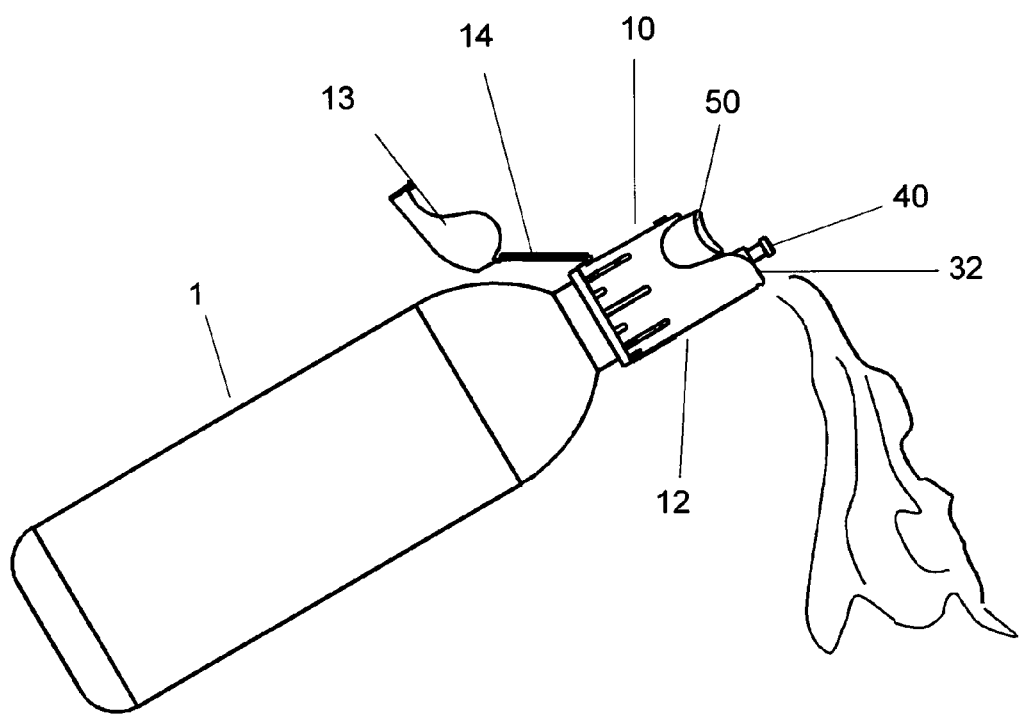
FIG. 12 shows a schematic view of the bottle cap of FIG. 7 connected with a bottle, wherein a user pours the liquid out from the bottle.

The bottle cap 10 of the present invention integrates effectively multiple structural components to offer a user multiple functionalities from a single bottle assembly. A user can drink water from through the straw 40 or 80, spray water as shown in FIG. 11, for example to the user's face, and pour water out for washing hands or other objects as shown in FIG. 12.

Figures 10A, 10B:
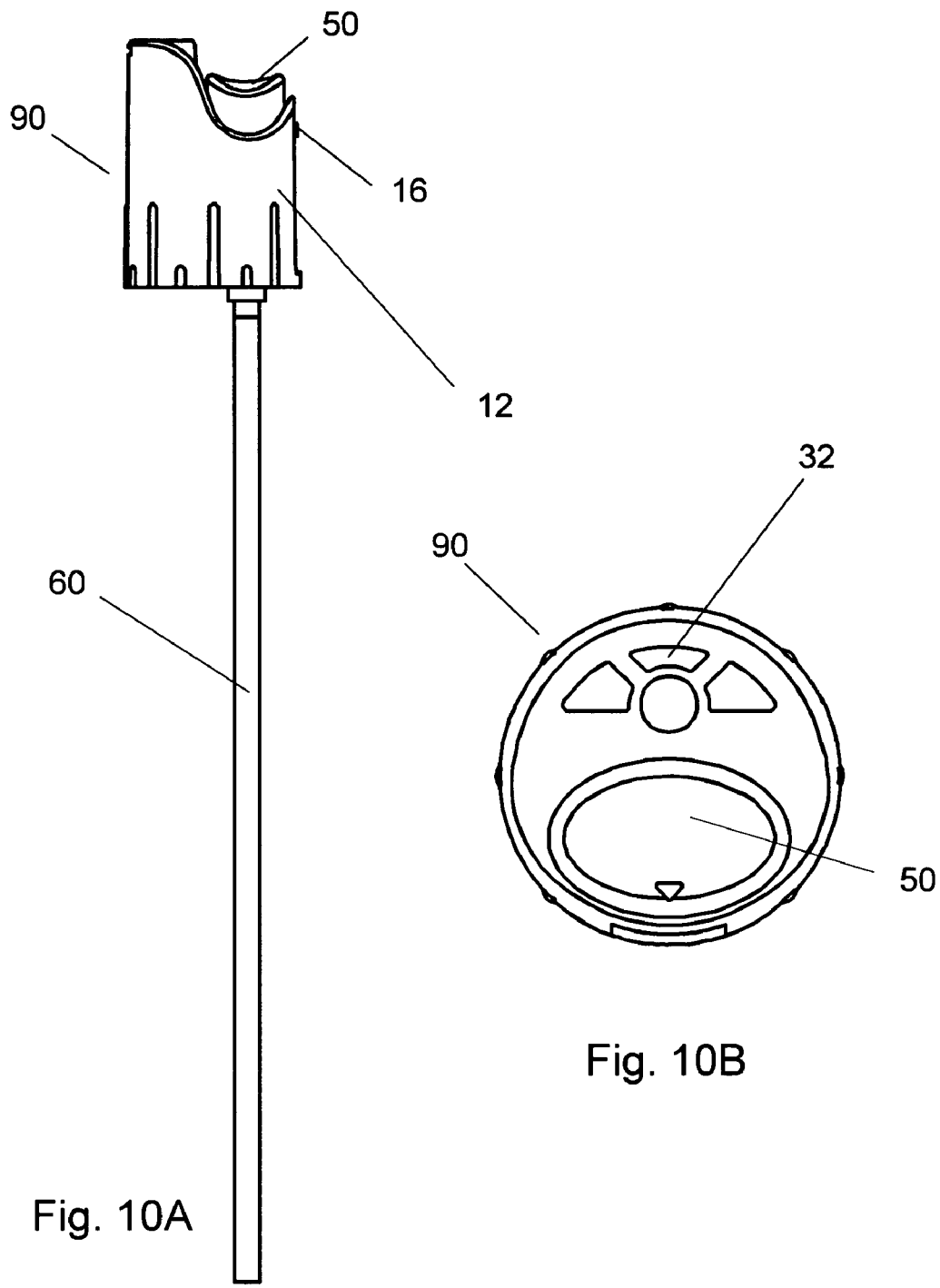
FIGS. 10A and 10B show a side and a top view of a bottle cap of a further embodiment of the present invention, wherein the bottle cap has only an aspiration tube for spray.

In another embodiment as shown in FIGS. 10A and 10B, a bottle cap 90 has the aspiration tube 60, but not the drinking straw 40 or 80. The opening used to adapt the drinking straw becomes a part of the openings 32. A user can drink through the openings 32 by tilting the bottle. Alternatively, the user can insert a commercially available straw through the openings 32 for drinking.

Furthermore, this type of bottle cap can also be used for non-drinking purpose. As one example, the bottle cap 90 shown in FIGS. 10A and 10B can be used with a bottle containing a liquid air refresher, a deodorizer, perfume, sun block lotion and other suitable liquid. The openings 32 vent the air refresher by evaporation and the pumping mechanism 51 allows a user to spray the liquid into air or specific locations. The air refresher bottle with the multiple functional cap can be placed in the bed room, bath room, kitchen and other suitable locations. As another example, the bottle cap 90 can also be used with a bottle containing a liquid cleaner. A user can spray or pour out the cleaner depending on the location and purpose of the use.

Additionally, the body 12 of the bottle cap 10 or 90 is a relatively longer than a commonly used drinking bottle cap, the exterior surface of the body 12 can contain decorative design, personal identification or logo for promotional purpose.

While the present invention has been described in detail and pictorially shown in the accompanying drawings, these should not be construed as limitations on the scope of the present invention, but rather as an exemplification of preferred embodiments thereof. It will be apparent, however, that various modifications and changes can be made within the spirit and the scope of this invention as described in the above specification and defined in the appended claims and their legal equivalents.

I claim:

1. A bottle cap for a neck of a bottle having a cap body with a lower portion that is shaped to connect with the bottle neck; an upwardly protruding nozzle at an upper portion of the bottle cap having an outlet opening at an edge portion of the nozzle for dispensing liquid therefrom by titling the bottle; a closing lid that is movable to close and open the outlet opening; and a telescope straw located adjacent to the outlet opening for drinking through the straw, said telescope straw having a first straw portion and a second straw portion, the first straw portion being secured to the cap body, and the second straw portion being axially movable and extending upwardly out of the nozzle; wherein an upper end of the second straw portion has a thickened portion, enabling a user to grip the thickened portion with the teeth or lips of the user for withdrawing the second straw portion; and a lower portion of the second straw portion has a radial thickened portion and the first straw portion has a waist at an upper end portion thereof that bears against the thickened portion of the lower portion of the second straw portion; and wherein the protruding nozzle defines a nozzle wall; a pump button, associated with a spray pump of the cap body, is placed adjacent to the nozzle wall and is directed upwardly in an axial direction of the bottle cap; and the spray pump is equipped with a spray nozzle that is directed substantially in a normal direction to the nozzle wall and away from an exposed surface of the nozzle wall.

2. The bottle cap of claim 1, wherein a lower edge of the nozzle wall extends to an upper portion of a first sidewall associated with a channel of the cap body and the channel has an opposite second sidewall that is adjacent to the circumference of the bottle cap.

3. The bottle cap of claim 2, wherein an upper surface of the pump button has a concave shape that has a length that is substantially parallel to the nozzle wall.

4. The bottle cap of claim 3, wherein the closing lid is connected to an exterior of the lower portion of the cap body by a shaft and the closing lid is swingably attached to the shaft.

5. A multifunctional bottle cap comprising:
   (a) a cap body having a lower portion with internal threads for connecting to a neck of a bottle, and an upper portion having an upwardly protruding nozzle with an outlet opening at an edge portion of the protruding nozzle, the outlet opening enabling dispensing liquid therefrom by tilting the bottle;
   (b) a straw having an upper end extending out of the protruding nozzle adjacent to the outlet opening, the straw being vertically movable to extend upwardly from the cap body, and
   (c) a spray assembly having a press pumping mechanism connected to an aspiration tube and a pump button extending upwardly, and a spray nozzle in perpendicular to a longitudinal axis of the cap body; the spray assembly being positioned next to the protruding nozzle.

6. The multifunctional bottle cap of claim 5, wherein the protruding nozzle defines a nozzle wall, the pump button is placed adjacent to the nozzle wall, and the spray nozzle is directed away from an exposed surface of the nozzle wall; a lower edge of the nozzle wall extends to an upper portion of a first sidewall associated with a channel of the cap body and the channel has an opposite second sidewall that is adjacent to the circumference of the bottle cap; and the pump button situates in the channel between the sidewalls; and wherein the nozzle wall and the sidewalls guide a direction of a finger of an user for activating the pump button substantially in parallel to the nozzle wall.

7. The multifunctional bottle cap of claim 6, wherein an upper surface of the pump button has a contour that has a length substantially parallel to the nozzle wall.

8. The multifunctional bottle cap of claim 7, wherein the straw has a sufficient length and a lower end of the straw extends to a bottom of the bottle when the straw is in a retrieved position.

9. The multifunctional bottle cap of claim 7, wherein the straw has an upper portion interconnecting a lower portion, the lower portion being flexible; the straw has a sufficient length and a lower end of the lower portion extends close to a bottom of the bottle when the straw is moved upward to an extending position for drinking.

10. The multifunctional bottle cap of claim 7, wherein the straw is telescopic having an outer straw and an inner straw; an upper end of the outer straw being secured to the cap body, and the inner straw being axially movable and extending upwardly out of the cap body.

11. The multifunctional bottle cap of claim 5 further comprising a closing lid connected to an exterior of the lower portion of the cap body by a shaft, the closing lid being swingably attached to the shaft; wherein the closing lid movably closes and opens the opening of the protruding nozzle.

* * * * *